US008060833B2

(12) United States Patent
Zagorski

(10) Patent No.: US 8,060,833 B2
(45) Date of Patent: Nov. 15, 2011

(54) METHOD AND SYSTEM FOR COMPUTER FOLDER MANAGEMENT

(75) Inventor: Michael C. Zagorski, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 11/677,182

(22) Filed: Feb. 21, 2007

(65) Prior Publication Data
US 2008/0201382 A1 Aug. 21, 2008

(51) Int. Cl.
G06F 3/048 (2006.01)
(52) U.S. Cl. .......................... 715/769; 715/764; 715/835
(58) Field of Classification Search .................. 715/760, 715/769–770, 764, 835
See application file for complete search history.

(56) References Cited

U.S. PATENT DOCUMENTS

| | | | |
|---|---|---|---|
| 6,934,932 B2 | 8/2005 | Dathathraya | |
| 7,289,973 B2 * | 10/2007 | Kiessig et al. | 707/1 |
| 2003/0014434 A1 | 1/2003 | Sebesta | |
| 2003/0033271 A1 | 2/2003 | Hendricks | |
| 2004/0054674 A1 | 3/2004 | Carpenter et al. | |
| 2004/0088306 A1 | 5/2004 | Murthy et al. | |
| 2004/0103102 A1 | 5/2004 | Nelson | |
| 2004/0199529 A1 | 10/2004 | Clark et al. | |
| 2004/0205455 A1 | 10/2004 | Dathathraya | |
| 2004/0205625 A1 | 10/2004 | Banatwala et al. | |
| 2004/0236731 A1 | 11/2004 | Tamai et al. | |
| 2004/0236775 A1 | 11/2004 | Leonardos | |
| 2004/0249902 A1 | 12/2004 | Tadayon et al. | |
| 2005/0041266 A1 | 2/2005 | Silverbrook et al. | |
| 2005/0055306 A1 | 3/2005 | Miller et al. | |
| 2005/0091316 A1 | 4/2005 | Ponce et al. | |
| 2005/0160373 A1 | 7/2005 | Chakravarty et al. | |
| 2005/0177796 A1 | 8/2005 | Takahashi | |
| 2006/0206450 A1 | 9/2006 | Fletcher et al. | |

OTHER PUBLICATIONS

Eric Grebler, "Microsoft(c) Windows XP Media Center Edition fast &easy", copyright 2003 by Premier Press, pp. 204-206, 229-238.*
Key Metric Software, "Find Empty Folders with FolderSizes", Internet Archive: http://www.foldersizes.com/foldersizes/find-empty-folders.htm, Feb. 5, 2006.*
Hatfield et al., "Windows XP in 10 Simple Steps or Less", copyright 2004 by Wiley Publishing, Inc., pp. 546-547.*
Folder Size, "Folder Size Explorer Extension", Internet Archive: http://foldersize.sourceforge.net, Feb. 9, 2005.*
Eder, et al., "Self-Maintained Folder Hierarchies As Document Repositories"—2001 IEEE, pp. 400-407.
Castellani, et al., "XFolders: A Flexible Worldflow System Based on Electronic Circulation Folders"—Proceedings of the 13th International Workshop on Database and Expert Systems Applications (DEXA '02)—2002 IEEE Computer Society.

* cited by examiner

Primary Examiner — William L Bashore
Assistant Examiner — Andrew Tank
(74) Attorney, Agent, or Firm — Scully, Scott, Murphy & Presser, P.C.; Steven L. Bennett, Esq.

(57) ABSTRACT

Disclosed are a method and system for managing groups of folders on a computer. The method comprises the step of presenting a graphical user interface (GUI) view to a user, said view identifying a multitude of folders, wherein some of said folders are empty, and in said view, the empty folders are designated in a defined manner. The user chooses a group of said folders by interacting with the GUI, and the user selects one of a group of given actions. In response to the user selecting that one action, the computer applies the selected action to all of said group of folders as a single operation.

12 Claims, 2 Drawing Sheets

METHOD AND SYSTEM FOR COMPUTER FOLDER MANAGEMENT

BACKGROUND OF THE INVENTION

1. Field of the Invention

The present invention generally relates to computers, and more specifically, the invention relates to the management of folders on computers.

2. Background Art

Most computer systems store data by physically encoding it as a data file on a storage device such as a hard magnetic disk. The software tools used to perform this storage and the subsequent access to, or manipulation of, the data file, are provided by a routine called a file system manager, which usually included in an operating system.

An operating system is a program or collection of programs, which allow control of the computer's physical devices. In a UNIX™-based system, the operating system interacts directly with the hardware, providing common services to programs and isolating the software and users from the hardware idiosyncrasies of a particular computer system. For example, the operating system may coordinate the sending of information to a printer to be printed, or commence the operation of an application program. Operating systems also have some manner of interface to communicate with the user, generally via a command line on the computer's monitor where the user can enter an instruction from the operating system's instruction set, or via a graphic user interface which presents a simpler means of entering the same kinds of instructions.

The file system management functions of the operating system (or simply, the file system manager) provides a standardized means of storing and accessing data on storage subsystems, being responsible for handling all requests to open, close, read, and write files. These data files are referred to by symbolic filenames, which tell the operating system where the data can be physically found. HPS, FAT, FAT32, NTFS and HPFS are common file systems used on personal computers.

In many computer systems, data files are sorted into a structure of folders, directories, subdirectories or similar categories, making them easier to identify and locate. In these systems, each file has a unique path name which identifies its location within the file structure, access to the data generally starting at the top and proceeding through the levels of the hierarchy. Most operating systems use these types of tree-like or hierarchical filing systems.

UNIX and MS-DOS computers, for example, have a "root" directory from which all other directories or sub-directories branch out. The syntax of the path name is usually a sequence of directory or filenames separated by the "/" character, each subsequent entry representing another level of the tree.

Folders can take up a considerable amount of DASD. Over time, users build up a massive hierarchy of folders. Through archiving and document expiration, many folders are empty and more than likely not needed. A user can go through and manually open each folder to see if it is empty, determine if it is needed and then delete the folder. This can be a labor-intensive activity, which most people will not do. In many computers, there is a huge amount of wasted DASD due to empty folders. Within many businesses and other enterprises, removing old folders will lower costs and provide other advantages.

SUMMARY OF THE INVENTION

An object of this invention is to provide a method and system for managing computer folders.

Another object of the present invention is to enable computer users to manage whole groups of folders at a time.

These and other objectives are attained with a method and system for managing groups of folders on a computer. The method comprises the step of presenting a graphical user interface (GUI) view to a user, said view identifying a multitude of folders, wherein some of said folders are empty, and in said view, the empty folders are designated in a defined manner. The user chooses a group of said folders by interacting with the GUI, and the user selects one of a group of given actions. In response to the user selecting that one action, the computer applies the selected action to all of said group of folders as a single operation.

The preferred embodiment of the invention provides a "Manage your Folders" dialog which will allow users to easily manage their folders. This dialog will flag empty folders, identify when the folder was last accessed, allow folder deletion, and allow the user to move folders around.

More specifically, in this preferred embodiment, a new action, ACTION>MANAGE FOLDERS, is added to an email service application such as Lotus Notes mail. For this Action, a dialog box will pop up with all the user-defined folders. To the right of each folder, the user will see the number of documents in the folder, empty folders will be highlighted in red and to the right of that number will be a column containing the last access date. To the left will be an empty checkbox. If the user selects the lowest child folder, only that one will be selected. If the user selects a parent, the parent along with all the child folders will be selected. The user will also have the option to select all. Once a folder or folders are selected, the user will have different actions available, like delete, merge, move, copy or rename.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

The present invention relates to a system and method for managing computer folders. The contents of these folders may comprise documents, files, electronic mails (e-mails), facsimiles, voicemail, video, data files created in word processors, spreadsheets, CAD, and other applications, as well as data stored in SQL servers, DBMS, databases developed for workstation and/or LANs environment, and/or other relevant information that is stored in a computer-readable format in a central location. It should be noted that this description discloses an electronic folder management system, which stores content that may be referred to as documents, files, or other relevant information interchangeably, which should not be used to restrict the scope of the present invention.

Figure 1:
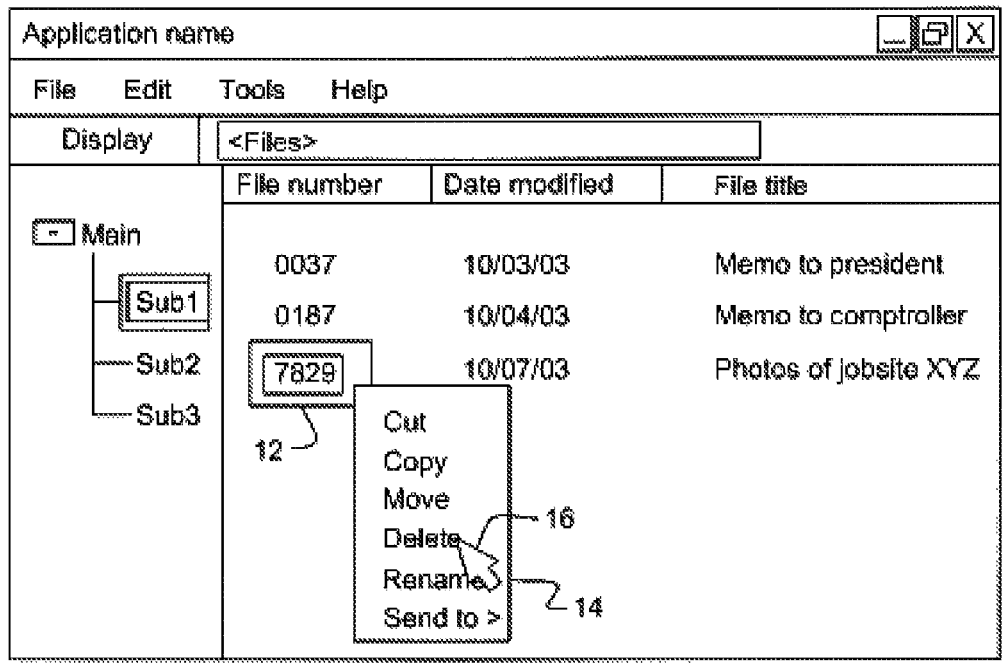
FIG. 1 depicts a prior art graphical user interface (GUI) for selecting a computer file or files and then applying an operation to the selected file or files.

Computer systems often display multiple files in a column or tree format in a graphical user interface (GUI). FIG. 1, for example, illustrates a prior art GUI 100, which includes a listing of file numbers, the dates they were last modified, and their titles. If a particular file is to be manipulated, such as being copied, moved, deleted, etc., then a focus area 102 is applied to a particular file, such as file number "7829." After focus area 102 is applied, the user can then "right click" or "double click" the focus area 102, causing a drop-down or pop-window 104 to appear, giving the user a list of operations that can be applied to the selected file. The user then manipulates a position of a pointer 106 over a particular operation (e.g., "Delete"). When the user "left clicks" the desired operation ("Delete"), typically a warning prompt (not shown) occurs, asking the user if she is certain that she wants to perform the operation. If the user clicks a "Yes" button, then the operation immediately occurs, often irreversibly.

As mentioned above, folders can take up a considerable amount of DASD. Over time, users build up a massive hierarchy of folders. Through archiving and document expiration, many folders are empty and more than likely not needed. A user can go through and manually open each folder to see if it is empty, determine if it is needed and then delete the folder. This, however, can be labor-intensive activity, which most people will not do.

Figure 2:
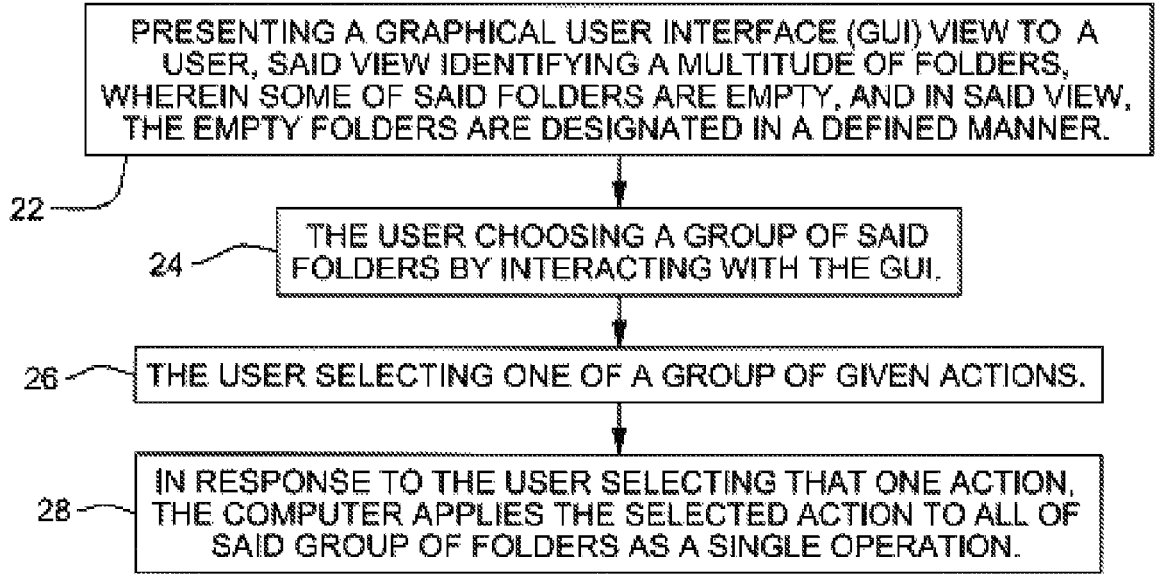
FIG. 2 is a flow chart showing a preferred method of implementing the present invention.

The present invention addresses this issue by providing a method and system for managing groups of files as whole groups. Generally, with reference to FIG. 2, in accordance with this invention, the method comprises the step 22 of presenting a graphical user interface (GUI) view to a user, said view identifying a multitude of folders, wherein some of said folders are empty, and in said view, the empty folders are designated in a defined manner. At step 24, the user chooses a group of said folders by interacting with the GUI, and at step 26, the user selects one of a group of given actions. In response to the user selecting that one action, the computer, at step 28, applies the selected action to all of said group of folders as a single operation.

The preferred embodiment of the invention provides a "Manage your Folders" dialog which will allow users to easily manage their folders. This dialog will flag empty folders, identify when the folder was last accessed, allow folder deletion, and allow the user to move folders around.

Figures 3, 4:
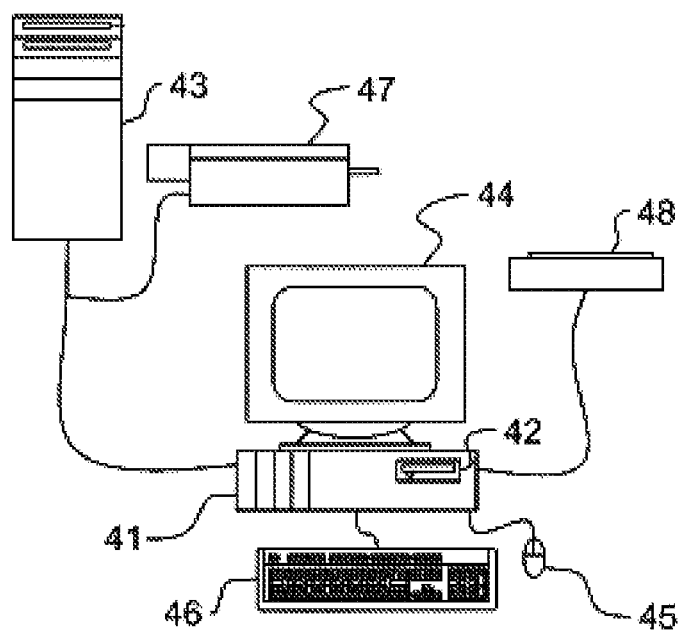
FIG. 3 illustrates a graphical user interface in accordance with the present invention.
FIG. 4 shows a computer system that may be used to carry out this invention.

More specifically, with reference to FIG. 3, in this preferred embodiment, a new action, ACTION>MANAGE FOLDERS 30, is added to an email service application such as Lotus Notes mail. From this Action, a dialog box will pop up with all the user-defined folders 32. To the right of each folder, the user will see the number of documents in the folder, empty folders will be highlighted in red and to the right of that number will be a column containing the last access date. To the left of each folder will be an empty checkbox 34. If the user selects the lowest child folder, only that one will be selected. If the user selects a parent, the parent along with all the child folders will be selected. The user will also have the option to select all. Once a folder or folders are selected, the user will have different actions 36 available like delete, merge, move, copy or rename.

When the "delete" action is chosen, all selected folders are deleted, and any documents that were in these folders are moved to a predefined folder called "Orphaned Documents". When the "merge" action is shown, all selected folders are merged into one folder (with a user defined name). All documents in these folders will be in the resulting folder. The "move" action allows the selected folders to be moved under a new parent folder. The "copy" action in the same as the "move" action but creates a copy of the selected folders. The "rename" operation allows the user to rename the selected folder. Preferably, the user also has a quick action caller 'Delete all empty folders' that, as the name implies, deletes all empty folders. In addition, the Manage Folders dialog preferably will have the ability to automatically pop up when the mail folder is opened.

The method of the present invention will be generally implemented by a computer executing a sequence of program instructions for carrying out the steps of the method and may be embodied in a computer program product comprising media storing the program instructions. Referring to FIG. 4, a computer system 40 is depicted on which the method of the present invention may be carried out. Processing unit 41, houses a processor, memory and other systems components that implement a general purpose processing system that may execute a computer program product comprising media, for example a floppy disc that may be read by processing unit 41 through floppy drive 42.

The program product may also be stored on hard disk drives within processing unit 41 or may be located on a remote system 42 such as a server 43, coupled to processing unit 41, via a network interface, such as an Ethernet interface. Monitor 44, mouse 45 and keyboard 46 are coupled to processing unit 41, to provide user interaction. Scanner 47 and printer 48 are provided for document input and output. Printer 48 is shown coupled to processing unit 41 via a network connection, but may be coupled directly to the processing unit. Scanner 47 is shown coupled to processing unit 41 directly, but it should be understood that peripherals may be network coupled or direct coupled without affecting the ability of workstation computer 40 to perform the method of the invention.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of managing groups of folders on a computer, comprising the steps of:

presenting a graphical user interface (GUI) view to a user, said view identifying a multitude of folders, wherein a plurality of said folders are empty of documents and some of the folders are not empty of documents, and in said view, the empty folders are designated in a defined manner;

showing in the GUI view a box including an indication, for each of the multitude of folders, of the number of documents in said each of the folders, said number of documents ranging from zero to more than one;

said user choosing a group of said multitude of folders by interacting with the GUI, said group comprised of said plurality of said empty folders and one or more of the folders having one or more documents;

the user inputting to the computer a single instruction to delete all of said folders in said group including said plurality of empty folders and all of said one or more of the folders in the group having one or more documents; and in response to said inputting the single instruction from the user, the computer deleting all of the folders in said group including all of said plurality of empty folders and the one or more folders in said group having one or more documents, as a single operation, removing said one or more documents from said one or more folders in said group, and storing the documents removed from said one or more folders in a predefined file thereby deleting all of the folders in the group of folders without deleting any of the files in said group of folders.

2. A method according to claim 1, wherein the presenting step includes the step of the computer automatically presenting said GUI view at regular, user-defined intervals.

3. A method according to claim 2, wherein, the user defined intervals are time intervals.

4. A method according to claim 1, comprising the further steps of providing the computer with first functionality to present the GUI view at regular intervals, and providing the computer with second functionality to enable the user to disable said first functionality.

5. The method according to claim 1, wherein the choosing, inputting and deleting occur at a first time; and the method comprises the further step of, at a second time, using a single user action to delete all empty folders on the computer.

6. The method according to claim 1, wherein the deleting includes permanently deleting from the computer all of the folders in said group as said single operation in response to the inputting the single instruction from the user.

7. A system for managing groups of folders on a computer, comprising one or more processing units configured for:

presenting a graphical user interface (GUI) view to a user, said view identifying a multitude of folders, wherein a plurality of said folders are empty of documents and some of the folders are not empty of documents, and in said view, the empty folders are designated in a defined manner;

showing in the GUI view a box including an indication, for each of the multitude of folders, of the number of documents in said each of the folders, said number of documents ranging from zero to more than one;

enabling said user to choose a group of said multitude of folders by interacting with the GUI, said group comprised of said plurality of said empty folders and one or more of the folders having one or more documents;

enabling the user to input into the system a single instruction to delete all of said folders in said group including said plurality of empty folder and all of said one or more of the folders in the group having one or more documents; and in response to the inputting the single instruction from the user to delete all of the folders in said group including all of said plurality of empty folders and the one or more folders in said group having one or more documents, as a single operation, removing said one or more documents from said one or more folders in said group, and storing the documents removed from said one or more folders in a predefined file thereby deleting all of the folders in the group of folders without deleting any of the files in said group of folders.

8. A system according to claim 7, wherein the one or more processing units are further configured for automatically presenting said GUI view at regular, user-defined intervals.

9. A system according to claim 7, wherein the one more processing units are provided with a first functionality to present the GUI view at regular intervals, and with functionality to enable the user to disable said first functionality.

10. A program storage device readable by computer, tangibly embodying a program of instructions executable by the computer to perform method steps for managing groups of folders on the computer, the method steps comprising:

presenting a graphical user interface (GUI) view to a user, said view identifying a multitude of folders, wherein of said folders are empty of documents and some of the folders are not empty of documents, and in said view, the empty folders are designated in a defined manner;

showing in the GUI view a box including an indication, for each of the multitude of folders, of the number of documents in said each of the folders, said number of documents ranging from zero to more than one;

enabling said user to choose a group of said multitude of folders by interacting with the GUI, said group comprised of said plurality of said empty folders and one or more of the folders having one or more documents;

enabling the user to input into the computer a single instruction to delete all of said folders in said group including said plurality of empty folders and all of said one or more of the folders in the group having one or more documents; and in response to the inputting the single instruction from the user the computer deleting all of the folders in said group including all of said plurality of empty folders and the one or more folders in said group having one or more documents, as a single operation, removing said one or more documents from said one or more folders in said group, and storing the documents removed from said one or more folders in a predefined file thereby deleting all of the folders in the group of folders without deleting any of the files in said group of folders.

11. A program storage device according to claim 10, wherein the presenting step includes the step of automatically presenting said GUI view at regular, user-defined intervals.

12. A program storage device according to claim 10, wherein said method steps further comprise providing the computer with first functionality to present the GUI view at regular intervals, and providing the computer with second functionality to enable the user to disable said first functionality.

* * * * *